US011964644B2

(12) United States Patent
Besier et al.

(10) Patent No.: US 11,964,644 B2
(45) Date of Patent: Apr. 23, 2024

(54) METHOD FOR OPERATING A BRAKE SYSTEM, AND BRAKE SYSTEM

(71) Applicant: Continental Teves AG & Co. oHG, Frankfurt am Main (DE)

(72) Inventors: Marco Besier, Bad Schwalbach (DE); Stefan Drumm, Saulheim (DE); Jürgen Böhm, Oberneisen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 980 days.

(21) Appl. No.: 16/477,336

(22) PCT Filed: Dec. 20, 2017

(86) PCT No.: PCT/EP2017/083840
§ 371 (c)(1),
(2) Date: Jul. 11, 2019

(87) PCT Pub. No.: WO2018/130392
PCT Pub. Date: Jul. 19, 2018

(65) Prior Publication Data
US 2019/0351886 A1    Nov. 21, 2019

(30) Foreign Application Priority Data

Jan. 12, 2017    (DE) ............... 10 2017 200 420.7

(51) Int. Cl.
*B60T 13/74* (2006.01)
*B60T 13/14* (2006.01)
(Continued)

(52) U.S. Cl.
CPC .......... *B60T 13/741* (2013.01); *B60T 13/662* (2013.01); *B60T 13/146* (2013.01); *B60T 13/686* (2013.01);
(Continued)

(58) Field of Classification Search
CPC ........ B60T 13/162; B60T 13/56; B60T 13/44; B60T 13/165; B60T 13/146; B60T 13/142
See application file for complete search history.

(56) References Cited

U.S. PATENT DOCUMENTS 9,108,604 B2    8/2015    Böhm et al.
9,315,180 B2    4/2016    Jungbecker et al.
(Continued)

FOREIGN PATENT DOCUMENTS

CN    102481914 A    5/2012
CN    104105626 A    10/2014
(Continued)

OTHER PUBLICATIONS

German Search Report for German Application No. 10 2017 200 420.7, with partial translation, dated Nov. 21, 2017—9 pages.
(Continued)

*Primary Examiner* — Christian Chace
*Assistant Examiner* — Katherine Marie Fitzharris
(74) *Attorney, Agent, or Firm* — BUCHANAN INGERSOLL & ROONEY PC

(57) ABSTRACT

A method for operating a motor vehicle brake system having hydraulic wheel brakes; an atmospheric pressure pressure medium reservoir; a pressure modulation unit setting wheel-specific brake pressures, an electrohydraulic pressure provision device connected to the pressure modulation unit and the pressure medium reservoir which outputs brake system pressure to the pressure modulation unit and draws in pressure medium from the reservoir; a first and second pressure activation valve connecting the pressure provision device to the pressure modulation device. A piston of the piston-cylinder arrangement separates two pressure spaces from one another. A pressure build-up occurs in the first pressure space during a backward movement of the piston (Continued)

and in the second pressure space during a forward movement of the piston. During a brake pressure build-up by a forward stroke of the piston, the activation valve is opened and the first pressure space is hydraulically separated from the pressure medium reservoir.

18 Claims, 1 Drawing Sheet

(51) Int. Cl.
*B60T 13/66* (2006.01)
*B60T 13/68* (2006.01)
*F16D 65/18* (2006.01)

(52) U.S. Cl.
CPC ......... *B60T 2270/602* (2013.01); *F16D 65/18* (2013.01)

(56) References Cited

U.S. PATENT DOCUMENTS

| | | | |
|---|---|---|---|
| 9,643,581 | B2 | 5/2017 | Yang |
| 9,751,511 | B2 | 9/2017 | Yang |
| 2013/0213025 | A1 | 8/2013 | Linden |
| 2015/0344012 | A1* | 12/2015 | Knechtges ............ B60T 13/686 |
| | | | 701/70 |
| 2016/0200307 | A1 | 7/2016 | Feigel |
| 2017/0144644 | A1* | 5/2017 | Kim ........................ B60T 7/042 |

FOREIGN PATENT DOCUMENTS

| | | | |
|---|---|---|---|
| CN | 105473396 A | | 4/2016 |
| DE | 102011080312 A1 | | 2/2012 |
| DE | 102014107112 A1 | | 11/2015 |
| DE | 102015224618 A1 | | 6/2016 |
| DE | 102015224621 A1 | | 6/2016 |
| DE | 102015103858 A1 | | 9/2016 |
| GB | 2139721 A | * | 11/1984 ............ B60T 13/143 |
| WO | 2012017037 A2 | | 2/2012 |

OTHER PUBLICATIONS

International Search Report and Written Opinion for International Application No. PCT/EP2017/083840, dated Apr. 11, 2018—9 pages.
Chinese Office Action for Chinese Application No. 201780083130.8, dated Dec. 1, 2020 with partial translation, 12 pages.
Korean Decision for Grant of Patent for Korean Application No. 10-2019-7022026, dated Mar. 25, 2021, with translation, 3 pages.

* cited by examiner

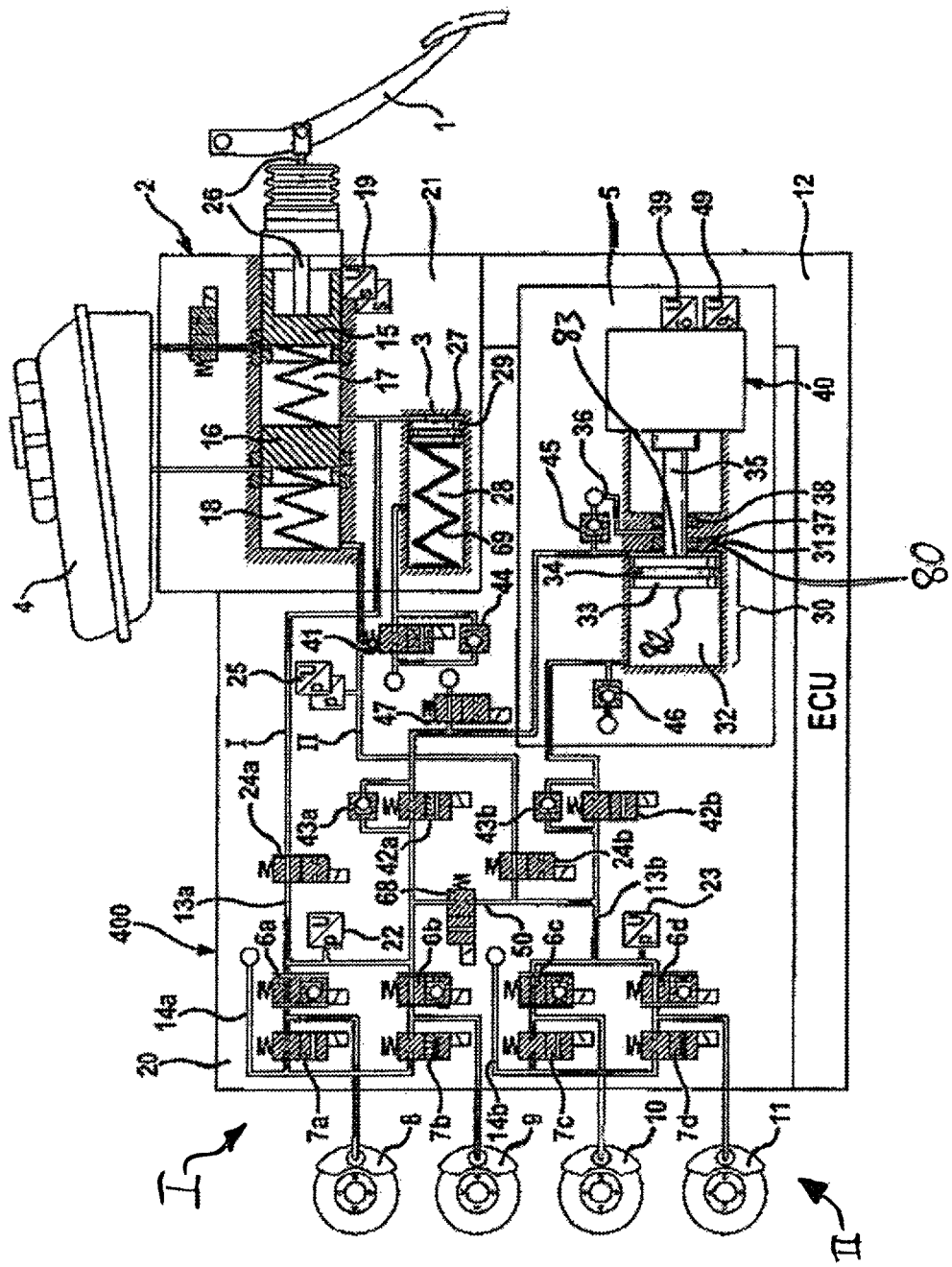

METHOD FOR OPERATING A BRAKE SYSTEM, AND BRAKE SYSTEM

CROSS REFERENCE TO RELATED APPLICATIONS

This application is the U.S. National Phase Application of PCT International Application No. PCT/EP2017/083840, filed Dec. 20, 2017, which claims priority to German Patent Application No. 10 2017 200 420.7, filed Jan. 12, 2017, the contents of such applications being incorporated by reference herein.

FIELD OF THE INVENTION

The invention relates to a method for operating a brake system for motor vehicles, which brake system, in a brake-by-wire operating mode, can be activated both by the vehicle driver and independently of the vehicle driver, and is operated preferentially in the brake-by-wire operating mode, having hydraulic wheel brakes, wherein two wheel brakes are hydraulically assigned to a first brake circuit and two wheel brakes are hydraulically assigned to a second brake circuit, having a pressure medium reservoir which is under atmospheric pressure, having an electronic open-loop and closed-loop control unit, having a pressure modulation unit for setting wheel-specific brake pressures, which are derived from the brake system pressure, having an electrohydraulic pressure provision device which is connected to the pressure modulation unit and to the pressure medium reservoir and which outputs the brake system pressure to the pressure modulation unit and which, for the compensation of its volume balance, draws in pressure medium from the pressure medium reservoir, having a first and a second pressure activation valve for connecting the pressure provision device to the pressure modulation device, wherein the pressure provision device comprises a double-acting piston-cylinder arrangement, wherein a piston of the piston-cylinder arrangement separates two pressure spaces from one another, wherein a pressure build-up occurs in the first pressure space during a backward movement of the piston and occurs in the second pressure space during a forward movement of the piston. The invention furthermore relates to a brake system.

BACKGROUND OF THE INVENTION

A method for operating a brake system of said type is known from DE 10 2011 080 312 A1, which is incorporated herein by reference. Here, during the backward stroke of the piston, a relatively high pressure can be generated with a relatively small surface area with an actuator force of equal magnitude.

A disadvantage of this method is that such a surface switchover is not performed during the forward stroke.

SUMMARY OF THE INVENTION

An aspect of the invention aims at improving such a method such that a relatively high pressure can also be generated during the forward stroke. It is also sought to specify a corresponding brake system.

With regard to the method, said object is achieved according to an aspect of the invention in that, during a brake pressure build-up by a forward stroke of the piston of the piston-cylinder arrangement or of the linear actuator in a predefined situation, in particular in the case of demand for a particularly high brake system pressure, the activation valve is opened and the first pressure space is hydraulically separated from the pressure medium reservoir, wherein the two pressure spaces are hydraulically connected to one another.

The predefined situation is preferably the demand for a particularly high brake system pressure. A particularly high brake system pressure particularly preferably prevails if the brake system pressure to be set is higher than a predefined threshold value.

An aspect of the invention is based on the consideration that the generation of a relatively high pressure may also be expedient during the forward stroke. During the forward stroke of the actuator, it is normally the case that the full piston surface area is effective. This is advantageous in particular in order to displace a large brake fluid volume into the wheel brake circuits in a short time or with a corresponding displacement travel of the piston. The full piston surface area is thus advantageous for displacing volumes quickly. In order to generate even higher pressures with a given actuator force, a switchover to a relatively small surface area is advantageous.

As has now been identified, a switchover to a relatively small surface area can also be performed during the forward stroke by virtue of the activation valve being opened, by means of which a hydraulic connection of the first pressure space to the wheel brakes is made possible, and by shutting off the connection of the first pressure space to the pressure medium reservoir and a hydraulic connection of the two pressure spaces to one another. In this case, the hydraulically effective surface during a forward stroke is the differential area between the two effective piston surfaces.

The brake system is preferably one for motor vehicles which can be actuated in a brake-by-wire operating mode either by the vehicle driver as well as independently of the vehicle driver, and is operated preferentially in the brake-by-wire operating mode.

The brake system preferably has a brake pedal for the actuation of a pedal decoupling unit having a housing and having two pistons which are arranged in series and which, in a housing, delimit two pressure chambers and on which, during the actuation of the brake system, an actuation force (pedal force) is exerted by the vehicle driver and which are positioned into an initial position by resetting springs when the brake pedal is not actuated.

The brake system preferably has a travel detection device which detects the actuation travel of the brake pedal or of a piston connected to the brake pedal.

A pedal feel simulator is advantageously provided which, in a brake-by-wire operating mode, provides the vehicle driver with the familiar brake pedal feel.

The pressure modulation unit advantageously has, for each wheel brake, an inlet valve and an outlet valve for setting wheel-specific brake pressures.

Separation valves are preferably provided for separating the pressure chambers of the master brake cylinder from the pressure modulation unit, by means of which separation valves the pressure spaces of the master brake cylinder are isolated during by-wire operation.

For an active pressure build-up in the wheel brakes independently of a driver, an electrohydraulic pressure provision device is advantageously provided which is connected to the pressure modulation unit and to the pressure medium reservoir and which outputs the brake system pressure to the pressure modulation unit and which, for the compensation of its volume balance, draws in pressure medium from the pressure medium reservoir.

For the connection of the pressure provision device to the pressure modulation device, pressure activation valves are advantageously provided, wherein the pressure provision device comprises a double-acting piston-cylinder arrangement, wherein a piston of the piston-cylinder arrangement separates two pressure spaces from one another, wherein a pressure build-up occurs in the first pressure space during a backward movement of the piston and occurs in the second pressure space during a forward movement of the piston.

The two brake circuits are advantageously hydraulically connected to one another in a manner separable by means of a circuit separation valve, wherein, for the brake pressure build-up, the circuit separation valve is opened. In this way, the two brake circuits are hydraulically connected to one another.

The second pressure space is preferably delimited by an end surface of the piston, wherein the first pressure space is delimited by an annular surface of the piston.

The annular surface is delimited at the inside preferably by a force transmission rod which runs partially in the first pressure space. Here, the force transmission rod is coupled to the rotation-translation mechanism.

In a first preferred embodiment, the annular surface of the piston and the cross-sectional area of the force transmission rod are of the same dimensions. This has the advantage that, in this way, during the forward and backward stroke, the same maximum pressure can be generated, or the same pressure can be generated with a given actuator force.

In a second preferred embodiment, the annular surface of the piston and the cross-sectional area of the force transmission rod may be of different dimensions.

A discharge valve is preferably arranged in a hydraulic connection of the first pressure space to the pressure medium reservoir.

The discharge valve is advantageously in the form of a normally open 2/2 directional valve.

The discharge valve is preferably used for the dissipation of brake system pressure in the situation described below. This is advantageous if, by means of ABS control or other brake control functions, a configuration is realized in which, at the present piston position of the linear actuator, the brake fluid volume that is situated in the wheel brakes can no longer be fully received in the second pressure chamber in order to lower the system pressure to atmospheric pressure.

The discharge valve is particularly preferably of analog design, wherein the valve is activated in analog fashion for the continuously variable dissipation of pressure.

For the active brake pressure build-up in the wheel brakes, the separation valves are advantageously closed.

The first pressure activation valve preferably connects the first pressure space to the pressure modulation device, and the second pressure activation valve preferably connects the second pressure space to the pressure modulation device, wherein, for the active brake pressure build-up, at least one of the two pressure activation valves is opened.

The first pressure activation valve is advantageously opened only during a backward stroke.

The second pressure activation valve is advantageously opened only during a forward stroke.

During a forward stroke with surface switchover, it is preferable for both pressure activation valves to be opened. Here, the surface switchover is realized in that the cross-sectional area of the force transmission rod takes effect as hydraulically effective surface area.

The pedal feel simulator is preferably hydraulically actuatable and has a simulator piston, a simulator chamber and a simulator spring chamber which is separated from the simulator chamber by the simulator piston and which accommodates a simulator spring, wherein the simulator chamber is hydraulically connected to one of the pressure chambers, and wherein the action of the travel simulator is activated in the "brake-by-wire" operating mode by means of a simulator enable valve which permits a connection of the simulator spring chamber to the pressure medium reservoir.

With regard to the brake system, the above-stated object is achieved according to an aspect of the invention by means for carrying out a method as mentioned above. In particular, an open-loop and closed-loop control unit is advantageously provided, in which the method is implemented in terms of hardware and/or software. The advantageous embodiments of the brake system mentioned in conjunction with the method are advantageous embodiments of the brake system.

The advantages of aspects of the invention lie in particular in the fact that, during the active pressure build-up, during a forward stroke of the pressure piston, higher forces can be realized when required by means of a surface switchover. By means of a suitable selection of the end and annular surfaces, up to three hydraulically effective surfaces can be utilized. By means of a controlled discharge of brake fluid with the aid of the discharge valve, an adverse effect on the hydraulic management can be eliminated, such that the system pressure can be set in a precise manner.

BRIEF DESCRIPTION OF THE DRAWINGS

An exemplary embodiment of an aspect of the invention will be discussed in more detail on the basis of a drawing.

In the drawing, the single FIGURE shows a brake system in a highly schematic illustration.

DETAILED DESCRIPTION OF THE PREFERRED EMBODIMENTS

The illustrated brake system comprises a hydraulic pedal decoupling unit 2 which is actuatable by means of an actuation or brake pedal 1, a pedal feel simulator 3 which interacts with the hydraulic pedal decoupling unit 2, a pressure medium reservoir 4 which is assigned to the hydraulic pedal decoupling unit 2, an electrically controllable pressure provision device 5, an electrically controllable pressure modulation device 20, which comprises inlet and outlet valves 6a-6d, 7a-7d and to the output ports of which wheel brakes 8, 9, 10, 11 of a motor vehicle (not illustrated) are connected, and an electronic open-loop and closed-loop control unit 12, which serves for processing sensor signals and for activating the electrically controllable components.

In the "brake-by-wire" operating mode, the input ports of the inlet valves 6a-6d are supplied, via system pressure lines 13a, 13b, with a pressure which is referred to as system pressure, wherein pressure sensors 22, 23 are provided for detecting the pressures prevailing in the system pressure lines 13a, 13b. The system pressure lines 13a, 13b form constituent parts of a first and of a second brake circuit which are denoted by the reference designations I and II, wherein, for example, the wheel brakes 8, 9 assigned to a front axle are connected to the first brake circuit I, and the wheel brakes 10, 11 assigned to a rear axle of the motor vehicle are connected to the second brake circuit II. Return lines 14a, 14b, which are connected to the output ports of the outlet valves 7a-7d, connect the outlet valves 7a-7d to the unpressurized pressure medium reservoir 4 (open system).

As can also be seen from the FIGURE, the hydraulic pedal decoupling unit 2, which can be regarded as an actuation unit of the brake system according to an aspect of the invention, has, in a (master brake cylinder) housing 21, two hydraulic pistons 15, 16 which are arranged in series and which delimit hydraulic pressure chambers 17, 18 which, together with the pistons 15, 16, form a two-circuit master brake cylinder or a tandem master cylinder. The pressure chambers 17, 18 are on the one hand connected via radial bores, which are formed in the pistons 15, 16, to the pressure medium reservoir 4, wherein said bores can be shut off by means of a relative movement of the pistons 17, 18 in the housing 21, and on the other hand to the abovementioned system pressure lines 13a, 13b, to which input ports of the abovementioned pressure modulation or inlet valves 6a-6d are connected. Incorporated into the hydraulic system pressure lines 13a, 13b are in each case one separation valve 24a, 24b, which are in the form of electrically actuatable, preferably normally open (NO) 2/2 directional valves. A pressure sensor 25 connected to the pressure space 18 detects the pressure built up in the pressure space 18 as a result of a displacement of the second piston 16. Furthermore, the pressure chambers 17, 18 accommodate resetting springs (not designated in any more detail) which preload the pistons 15, 16 counter to the actuation direction. Here, a piston rod 26 which is coupled to the brake pedal 1 interacts with the first (master cylinder) piston 15, wherein the actuation travel of the brake pedal 1 or of the piston 15 coupled to the brake pedal is detected by a travel sensor 19, which is preferably of redundant design.

Furthermore, from the diagrammatic illustration of the brake system according to an aspect of the invention, it can be seen that the pedal feel simulator device 3 is of hydraulic design and is composed substantially of a simulator chamber 27, a simulator spring chamber 28 with simulator spring 69, and of a simulator piston 29 which separates the two chambers 27, 28 from one another. Here, the simulator chamber 27 is connected to the first pressure space 17 of the tandem master cylinder 2, whereas the simulator spring chamber 28 is connected via an electrically actuatable simulator enable valve 41 to the abovementioned pressure medium reservoir 4. A check valve 44 connected in parallel with respect to the simulator enable valve 41 is connected to the simulator spring chamber 28 and permits a substantially unthrottled inflow of the pressure medium into the simulator spring chamber 28 independently of the switching state of the simulator enable valve 41 and independently of a throttling action of the hydraulic simulator outflow connections.

It can also be seen in the FIGURE that the electrohydraulic pressure provision device 5 is in the form of a hydraulic, double-acting cylinder-piston arrangement 30, the piston 33 of which is, by means of a force transmission rod 35, actuatable by a schematically indicated electric motor 40 via a rotation-translation mechanism which is not illustrated. The electric motor 40 and the rotation-translation mechanism form a linear actuator, wherein a merely schematically indicated rotor position sensor which serves for the detection of the rotor position of the electric motor 40 is denoted by the reference designation 39. Further sensors, such as for example a temperature sensor 49, provide the electronic open-loop and closed-loop control unit 12 with state information relating to the electric motor 40 or to the linear actuator.

The annular surface 80, facing toward the linear actuator, of the piston 33 delimits a first pressure space 31, whereas the end surface 82, pointing to the left in the drawing, of said piston 33 delimits a second hydraulic pressure space 32. The hydraulically effective cross-sectional area of the first pressure space 31 is reduced by the cross-sectional area 83 of the rod 35, which serves for the force transmission between linear actuator 40 and piston-cylinder arrangement 30 and which protrudes into the first pressure space 31. Here, the first pressure space 31 is sealed off with respect to a schematically indicated hydraulic connection 36, which leads to the pressure medium reservoir 4, by means of a first sealing element 37 which is configured to seal off against a pressure gradient from the first pressure space 31 to the hydraulic connection 36. A second sealing element 38 seals off the hydraulic connection 36 with respect to the linear actuator 40. A third sealing element 34, which is arranged on the piston 33, seals off the first pressure space 31 with respect to the second pressure space 32.

Furthermore, the two pressure spaces 31, 32 are connected to the pressure medium reservoir 4 via check valves 45, 46 which close in the direction of said pressure medium reservoir, wherein, furthermore, an electrically actuatable, preferably normally open (NO) 2/2 directional valve or discharge valve 47 is arranged between the first pressure space 31 and the pressure medium reservoir 4. Finally, it can be seen from the FIGURE that the two pressure spaces 31, 32 are connectable to the brake circuits I, II or input ports of the inlet valves 6a-6d by means of the opening of electrically actuatable activation valves 42a, 42b which are incorporated into the abovementioned system pressure lines 13a, 13b. Here, in each case one check valve 43a, 43b which closes in the direction of the pressure spaces 31, 32 is connected in parallel with respect to the activation valves 42a, 42b. The two brake circuits I, II or the system pressure lines are connected by means of a further hydraulic connection 50, which can be opened up and shut off by means of an electrically actuatable, preferably normally closed (NC) 2/2 directional valve 68. It must also be mentioned that all circular symbols which are assigned for example to the line portions 14a, b, to the check valves 45, 46 etc. represent hydraulic lines which lead to the pressure medium reservoir 4.

In the normal situation, in the brake-by-wire operating mode, the separation valves 24a, 24b are closed, such that the pressure spaces 17, 18 of the tandem master brake cylinder are hydraulically separated from the brake circuits I, II. The simulator valve 41 is opened. The connecting valve 68 is opened, such that the two brake circuits are connected. The activation valve 42b is opened, such that pressure can be actively built up in the wheel brakes 8, 9, 10, 11 by means of the pressure provision device 5. Here, during a forward stroke, the piston 33 is displaced into the pressure space 32, such that brake fluid is displaced into the brake circuits I, II by the end surface 82 of the piston 33. In this way, the greatest possible brake medium volume can be displaced into the wheel brakes 8, 9, 10, 11. System pressure can thus be increased or built up by means of a forward stroke of the actuator, and can be reduced or dissipated again by means of a backward stroke.

In situations in which it is sought to attain relatively high pressures during the forward stroke, an aspect of the invention proposes a pressure build-up with surface switchover. For this purpose, additionally, the activation valve 42a is opened and the discharge valve 47 is closed. The circuit separation valve 68 is actively opened, and the two activation valves 42a, 42b are actively opened. As is conventional during by-wire operation, the separation valves 24a, 24b are closed, and the simulator valve 41 is actively opened. By means of this switching configuration, the two pressure chambers 31, 32 are hydraulically connected to one another. Only the cross-sectional area 83 of the force transmission rod 35 remains hydraulically active, which discharges brake fluid into the brake circuits I, II. With an actuator force of equal magnitude, it is possible in this way, with an actuator force of equal magnitude, for a relatively high pressure to be generated during the forward stroke of the actuator. This is achieved by means of the relatively small effective piston surface relative to the end surface 82.

The annular surface 80 of the piston and the cross-sectional area 83 of the force transmission rod 35 may be of the same dimensions, such that the same pressure can be generated during the forward and backward strokes with a given actuator force. If a variation of hydraulically effective surfaces of different size is desired, it is possible for end surface 82, annular surface 80 and cross-sectional area 83 to be selected to be of different sizes.

By means of the discharge valve 47, which is preferably of analog design, brake fluid is preferably discharged into the pressure medium reservoir 4. This is preferably performed if, owing to control processes, the brake fluid volume in the wheel brakes or in the brake circuits I, II can no longer be received in the pressure chamber 32. That is to say, in the event of a stroke of the piston 33 in the direction of the actuator (motor+rotation-translation mechanism) with closed activation valve 42*a* and open NO discharge valve 47, as is conventional during by-wire operation, the excess brake fluid volume of the wheel brakes 8, 9, 10, 11 cannot be received in the chamber 32. In this situation, an analog, continuously variable pressure dissipation via the discharge valve 47 is advantageous. In this way, a deviation in relation to the desired brake system pressure is prevented.

The invention claimed is:

1. A method for operating a brake system for motor vehicles comprising:
    a) hydraulic wheel brakes, wherein two wheel brakes are hydraulically assigned to a first brake circuit and two wheel brakes are hydraulically assigned to a second brake circuit;
    b) a pressure medium reservoir which is under atmospheric pressure;
    c) an electronic open-loop and closed-loop control unit;
    d) a pressure modulation unit for setting wheel-specific brake pressures, which are derived from the brake system pressure;
    e) an electrohydraulic pressure provision device which is connected to the pressure modulation unit and to the pressure medium reservoir and which outputs the brake system pressure to the pressure modulation unit and which, for the compensation of its volume balance, draws in pressure medium from the pressure medium reservoir;
    f) a first and a second pressure activation valve for connecting the pressure provision device to the pressure modulation unit,
    wherein the pressure provision device comprises a double-acting piston-cylinder arrangement, wherein a piston of the piston-cylinder arrangement separates two pressure spaces from one another, wherein a pressure build-up occurs in the first pressure space during a backward movement of the piston and occurs in the second pressure space during a forward movement of the piston, and wherein the two pressure spaces are hydraulically connectable to one another in a manner separable by a circuit separation valve,
    wherein during a brake pressure build-up by a forward stroke of the piston of the piston-cylinder arrangement in a predefined situation, (i) the first pressure activation valve is opened; (ii) the first pressure space is hydraulically separated from the pressure medium reservoir; and (iii) the circuit separation valve is opened to hydraulically connect the two pressure spaces to one another.

2. The method as claimed in claim 1, wherein the second pressure space is delimited by an end surface of the piston, and wherein the first pressure space is delimited by an annular surface of the piston.

3. The method as claimed in claim 2, wherein the annular surface is delimited at the inside by a force transmission rod which runs partially in the first pressure space.

4. The method as claimed in claim 3, wherein the annular surface of the piston and the cross-sectional area of the force transmission rod are of the same dimensions.

5. The method as claimed in claim 3, wherein the annular surface of the piston and the cross-sectional area of the force transmission rod are of different dimensions.

6. The method as claimed in claim 1, wherein a discharge valve is arranged in a hydraulic connection of the first pressure space to the pressure medium reservoir.

7. The method as claimed in claim 6, wherein the discharge valve is designed as a normally open 2/2 directional valve.

8. The method as claimed in claim 6, wherein, for the dissipation of brake system pressure, the discharge valve is opened.

9. The method as claimed in claim 8, wherein the discharge valve is of analog design, and wherein the valve is activated in an analog fashion for the continuously variable dissipation of pressure.

10. The method as claimed in claim 1, wherein, for the active brake pressure build-up, the separation valves are closed.

11. The method as claimed in claim 1, wherein the first pressure activation valve connects the first pressure space to the pressure modulation unit, and wherein the second pressure activation valve connects the second pressure space to the pressure modulation unit, and wherein, for the active brake pressure build-up, at least one of the two pressure activation valves is opened.

12. The method as claimed in claim 11, wherein the first pressure activation valve is opened only during a backward stroke.

13. The method as claimed in claim 11, wherein the second pressure activation valve is opened only during a forward stroke.

14. The method as claimed in claim 11, wherein, during a forward stroke with surface switchover, both pressure activation valves are opened.

15. A brake system comprising:
    a) hydraulic wheel brakes, wherein two wheel brakes are hydraulically assigned to a first brake circuit and two wheel brakes are hydraulically assigned to a second brake circuit;
    b) a pressure medium reservoir which is under atmospheric pressure;
    c) an electronic open-loop and closed-loop control unit;
    d) a pressure modulation unit for setting wheel-specific brake pressures, which are derived from the brake system pressure;
    e) an electrohydraulic pressure provision device which is connected to the pressure modulation unit and to the pressure medium reservoir and which outputs the brake system pressure to the pressure modulation unit and which, for the compensation of its volume balance, draws in pressure medium from the pressure medium reservoir;

f) a first and a second pressure activation valve for connecting the pressure provision device to the pressure modulation unit, wherein the pressure provision device comprises a double-acting piston-cylinder arrangement, wherein a piston of the piston-cylinder arrangement separates two pressure spaces from one another, wherein a pressure build-up occurs in the first pressure space during a backward movement of the piston and occurs in the second pressure space during a forward movement of the piston, and wherein the two pressure spaces are hydraulically connectable to one another in a manner separable by a circuit separation valve, wherein during a brake pressure build-up by a forward stroke of the piston of the piston-cylinder arrangement in a predefined situation, the brake system is configured to (i) open the first pressure activation valve; (ii) hydraulically separate the first pressure space from the pressure medium reservoir; and (iii) open the circuit separation valve to hydraulically connect the two pressure spaces to one another.

16. The method as claimed in claim 7, wherein, for the dissipation of brake system pressure, the discharge valve is opened.

17. The method as claimed in claim 1, wherein the predefined situation is in a case of demand for a particularly high brake system pressure.

18. The method as claimed in claim 1, wherein before the circuit separation valve is opened to hydraulically connect the two pressure spaces to one another in the predefined situation, the two pressure spaces are separated from one another by the circuit separation valve.

* * * * *